United States Patent [19]

Bertoni

[11] Patent Number: 5,685,620
[45] Date of Patent: Nov. 11, 1997

[54] LINK FOR A CRAWLER TRACK APPLICABLE IN PARTICULAR TO LOW-CAPACITY TRACKED MACHINES

[75] Inventor: Giovanni Bertoni, Ferrara, Italy

[73] Assignee: Berco, S.p.A., Copparo, Italy

[21] Appl. No.: 415,628

[22] Filed: Apr. 3, 1995

[30] Foreign Application Priority Data

Apr. 15, 1994 [IT] Italy .................. MI940280 U

[51] Int. Cl.⁶ .................................. B62D 55/26
[52] U.S. Cl. ........................... 305/46; 305/201
[58] Field of Search ................ 305/39, 46, 51, 305/160, 185, 191, 192, 200, 201, 111, 113

[56] References Cited

U.S. PATENT DOCUMENTS

| | | | |
|---|---|---|---|
| 1,490,183 | 4/1924 | Parsons | 152/394 X |
| 1,645,089 | 10/1927 | Burdette | 152/394 X |
| 2,823,082 | 2/1958 | Bauer, Jr. | 305/200 X |
| 3,641,662 | 2/1972 | Garman et al. | 305/185 X |
| 4,586,757 | 5/1986 | Bloechlinger | 305/21 X |
| 4,765,694 | 8/1988 | Cory | 305/51 X |
| 5,261,733 | 11/1993 | Hara | 305/51 X |

FOREIGN PATENT DOCUMENTS 4129889  4/1992  Japan ......................... 305/51

*Primary Examiner*—Russell D. Stormer
*Attorney, Agent, or Firm*—Hedman, Gibson & Costigan, P.C.

[57] ABSTRACT

A crawler link used in an endless track vehicle having monolithic shoe portions made of iron and an elastomer. The link comprises a shoe portion, a bush, rails and hinge eyelets, and is cast in one piece to avoid the disassembling of components during replacement. An elastomer portion, with tapered surfaces for efficient gripping and traction, is directly applied by vulcanization to the lower surface of the shoe portion of the link.

1 Claim, 3 Drawing Sheets

LINK FOR A CRAWLER TRACK APPLICABLE IN PARTICULAR TO LOW-CAPACITY TRACKED MACHINES

This invention relates to an improved link for a crawler track applicable in particular to low-capacity tracked machines. In current low-capacity tracked machines (commonly known as mini-excavators), the mechanical power required for their advancement is transmitted to the ground by crawler tracks which depending on requirements can be either totally of metal, or totally of rubber, or of metal provided with a vulcanized rubber shoe and defined for convenience as "rubber-covered".

The totally rubber track was conceived to enable the machine to rest on the ground with an effect similar to that which a conventional pneumatic tyre would exert, and which for convenience can be defined as "soft", hence preventing the destructive effects which the very conventional metal track can have on the ground. Totally rubber tracks have however a shorter life than totally metal tracks, particularly if used in situations where considerable traction and manoeuvrability are required. Experience has also shown that strengthening the metal core results in stiffening of the structure of a totally rubber track with consequent difficulty of articulating it about the drive and tensioning wheels, hence leading to premature deterioration. To obviate the drawbacks of totally rubber tracks but without introducing those of totally metal tracks, rubber-covered tracks have been conceived, ie tracks in which the metal links are provided with a vulcanized rubber shoe. Such tracks are therefore usable when considerable traction and manoeuvrability are required together with "soft" bearing on the ground.

The links of such tracks are formed from a relatively large number of elements, this number further increasing if the rubber shoe is fixed mechanically to the metal part. The relatively large number of elements means that tracks of this type are unfortunately relatively costly, their cost tending to further increase as their nominal link dimensions decrease, hence in particular penalizing mini-excavators, these being precisely the machines which mostly use such rubber-covered tracks.

The object of the present invention is to obviate the aforesaid drawbacks by making the construction of rubber-covered tracks as economical as possible, hence favouring their advantageous application to tracked machines in general and to mini-excavators in particular.

This object is attained by an improved crawler track link in accordance with the first claim.

This link when connected to other identical links forms a track which offers all the advantages of rubber-covered tracks while being of integral form and structure. The reduced number of its component parts means that it can be produced at tendentially low cost especially where its nominal dimensions are the small dimensions typical of mini-excavator tracks.

The invention is illustrated by way of non-limiting example in the figures of the accompanying drawings.

Figure 1:
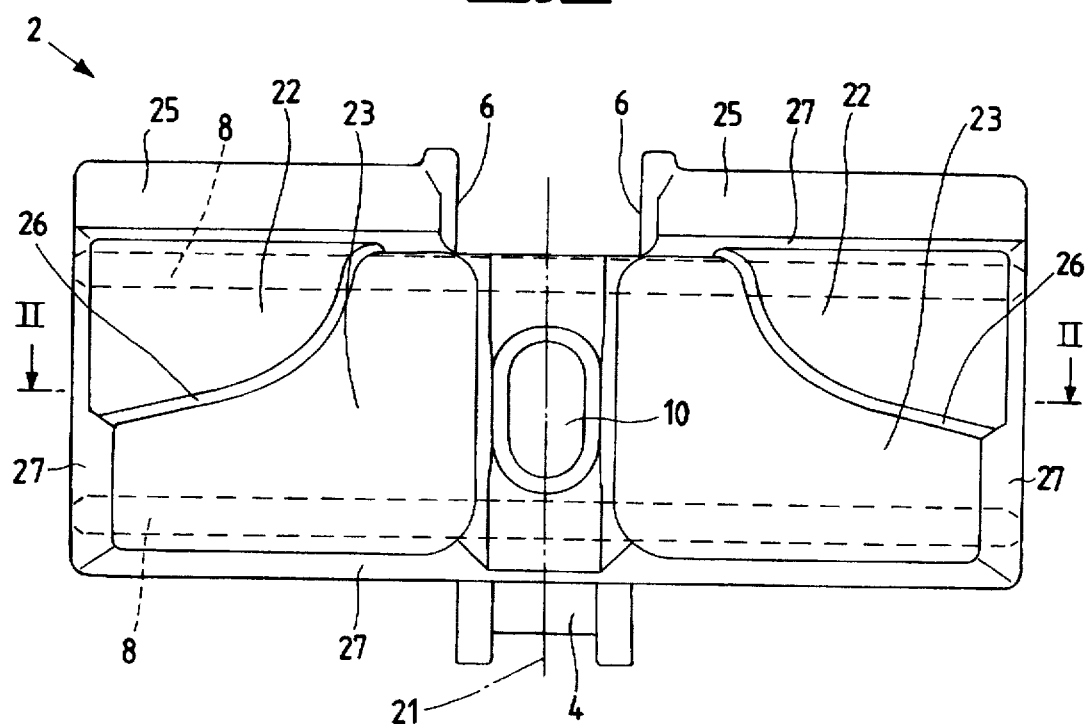
FIG. 1 is a plan view of the link of the invention seen from below.
Figure 2:
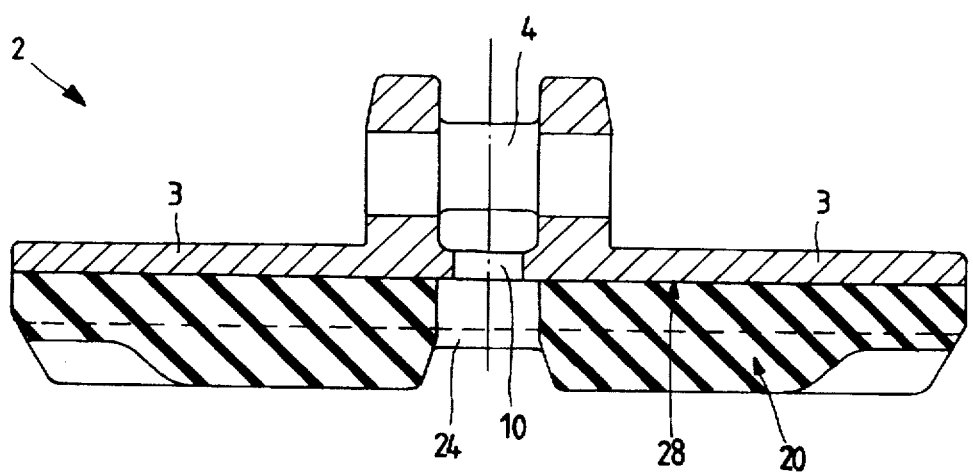
FIG. 2 is a section on the line II—II of FIG. 1
Figure 3:
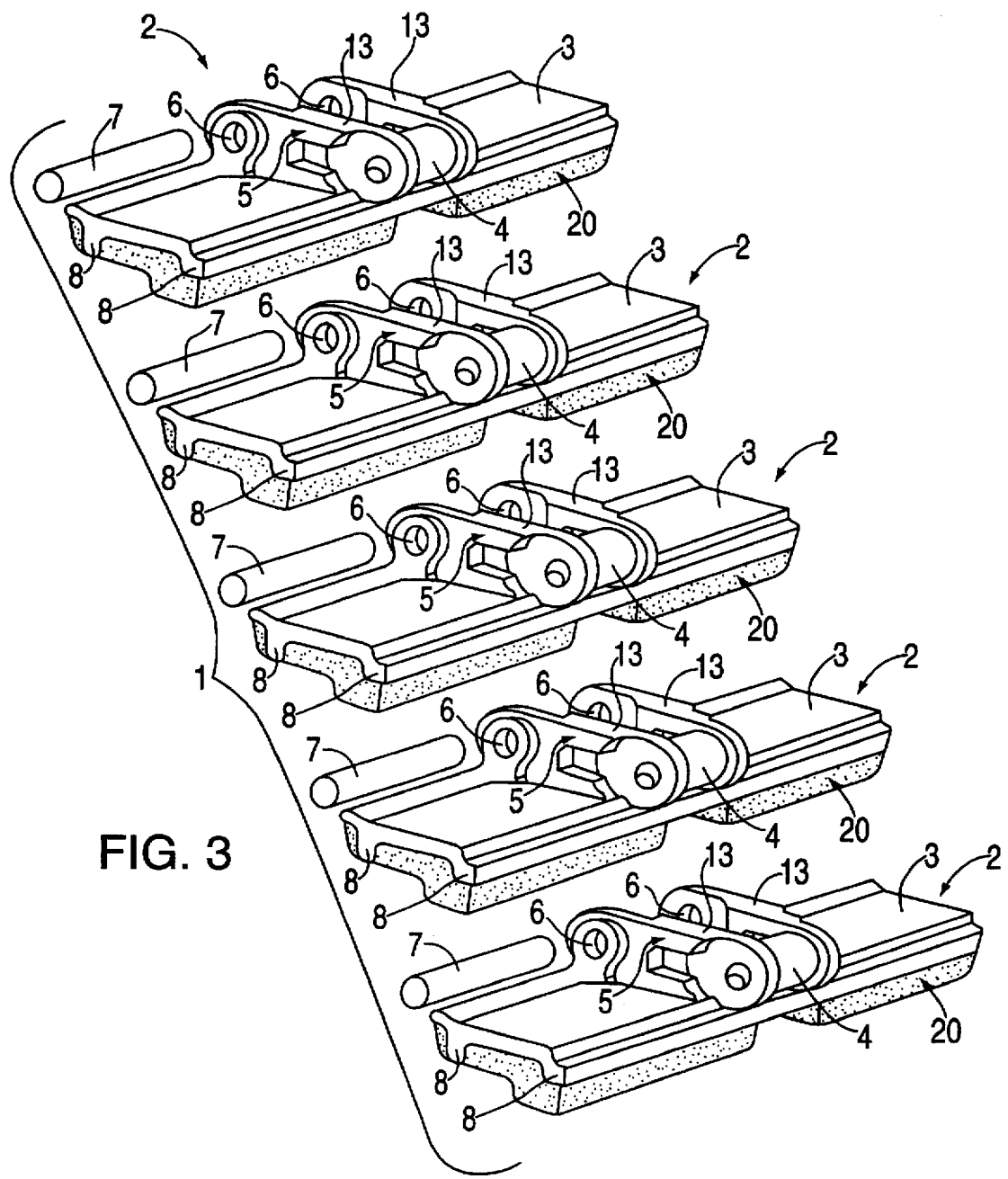
FIG. 3 is an exploded view of a track portion formed from links of the invention.
Figure 4:
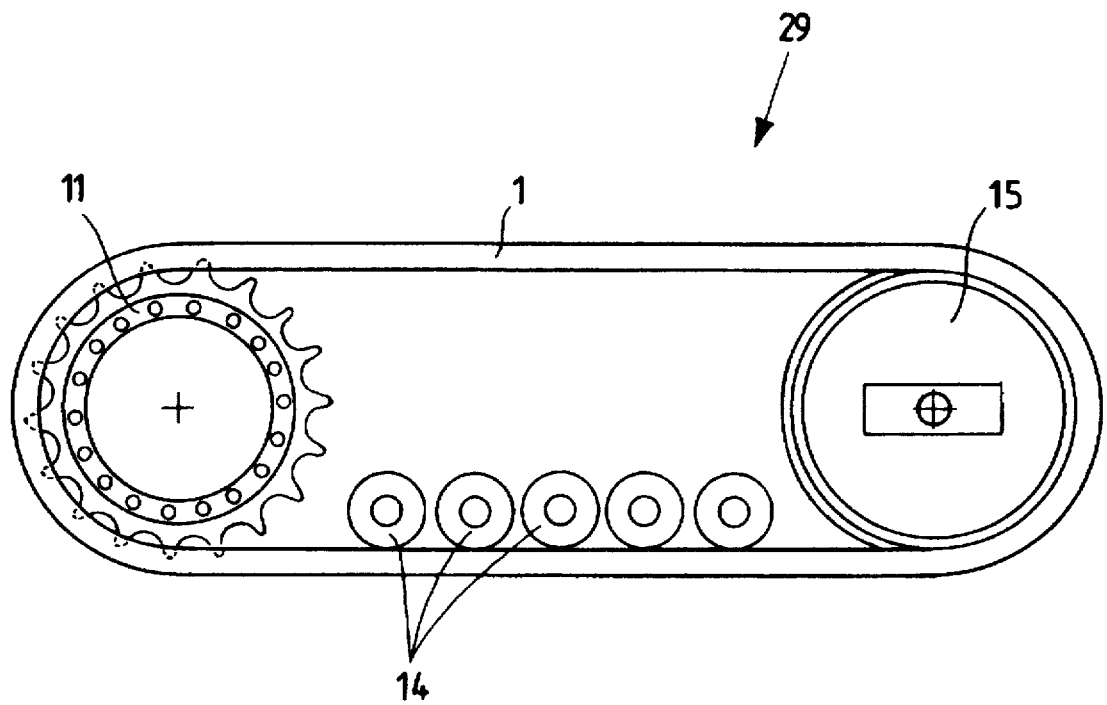
FIG. 4 shows a running gear assembly provided with the track of FIG. 3.

With reference to the aforesaid figures, the link of the invention, indicated overall by 2, comprises a shoe portion 3, a bush portion 4, two rail portions 5, two hinge eyelet portions 6, a pin 7 and an elastomer portion 20. When connected together by the pins 7, the links form a track 1 installable on a running gear assembly 29. In this case the links 2 are engaged by bearing wheels or track guide rollers 14 and pass about an idle wheel 15 and a drive wheel 11.

The shoe portion 3 is formed from two transverse bars 8 joined together by a web 9. At least one slot 10 is provided in the web 9 along its centre line. Because of the slot 10, provided in each shoe portion 3, the track 1 is self-cleaning, in that the drive wheel 11 is able to expel the debris which penetrates between the links 2, so limiting the "packing" effect. In this respect it is known that under certain working conditions, such as on clay soil, straw mixed with wet earth, etc., the track tends to clog. Under such conditions articulation is impeded and excess tension is created in the track, which however the slot 10 is able to eliminate by allowing improved discharge of the material clogging the track. The slot 10 is of a shape such that it possesses a major axis. This characteristic enables the link 2 to be fixed in a predetermined position on machine tools or on automatic machines for assembling the relative track 1.

This axis preferably coincides with the axis 21 of symmetry of the link or of normal advancement of the link when in operation. The bush portion 4, the two rail portions 5 and the two hinge eyelet portions 6 are cast in a single piece, hence avoiding costly separate production of the elements and their assembly. In this respect, the rail portions 5 have their first ends cast in one piece with the two opposing ends of the bush portion 4, and their second ends each defining a respective hinge eyelet portion 6. The axial length of the bush portion 4 is slightly less than the distance between the facing inner surfaces of the hinge eyelet portions 6, to enable adjacent links 2 of the track 1 to be connected together. The inner diameter of the bush portion 4 and that of the hinge eyelet portion 6 are such that when they are fitted with the pin 7, the pin becomes axially locked, while at the same time enabling adjacent links to mutually swivel. The rail portions 5 comprise slide surfaces 43, parallel to and opposite the shoe portion 3, on which the slide rollers 14 of the track rest. The slide surfaces 13 have a regular and continuous form, and besides engaging the rollers 14 they enable the machine to be supported, in addition to guiding the track 1.

The elastomer portion 20 is applied by vulcanization directly to at least part of the lower surface 28 of the shoe portion 3. It therefore forms a shoe of yieldable soft material allowing soft contact with the ground on which the link and hence the relative track rest. The portion 20 is symmetrical about the axis 21. It is formed substantially from two first half-portions which are identical and hence indicated by the same reference numeral 22, and two second identical half-portions indicated by the same reference numeral 23. The first half-portions 22 have a thickness less than that of the second half-portions 23 but sufficient to cover the transverse bars 8. Each first half-portion 22 is separated from its adjacent second half-portion 23 along an arched profile 26 which is concave to said first portion 22. The second half-portions 23 are arranged on opposite sides of the slot 10 and connected together by a thin layer 24. Both the first half-portions 22 and second half-portions 23 have bevelled edges 27 and do not cover that lower surface of the rear end part 25 of the shoe portion 3 which when the track is assembled is intended to overlie the link which precedes it in the direction of normal track advancement. The aforedescribed structure of the elastomer portion 20 is that which on the basis of tests has been found to currently offer the best compromise between ground gripping capacity (whether the ground is hard, yieldable or muddy), stability and low vibration at speed, and wear resistance. The elastomer used to form the portion 20 is chosen to optimize the relationship between cost and life of said portion 20. The material currently preferred is a mixture of natural rubber and synthetic rubber, the content of this latter being a maximum of 15%. After vulcanization this mixture can attain a minimum ultimate tensile strength of 220 daN/cm², a hardness of about 70 Shore, a minimum elongation of 460%, a minimium tear resistance in accordance with ASTM D624 of 150 daN/cm², an abrasion resistance in accordance with DIN 535161 of 90 units maximum, and a density of 1.15 kg/dm³.

The lower surface 28 of the shoe portion 3 to which the elastomer portion 20 adheres has a roughness achieved by sand-blasting. This roughness has proved excellent for fixing said elastomer portion 20 by vulcanization. To further favour adhesion of the elastomer portion 20 to said lower surface 28 of the portion 3, this latter is treated with a deoxidant, and between this and the portion 20 there are interposed in the stated order a thermoplastic polymer layer with softening point of 150° C. and a layer of natural rubber between 0.5 and 1.0 mm thick vulcanizable at about 160° C. for about 30 minutes. Because of their small thickness, these layers are not visible on the figures.

The track 1 is assembled by connecting each bush portion 4 of a link 2 to pairs of hinge eyelet portions 6 of the adjacent link 2 by means of pins 7. Having formed the track 1, the outer cylindrical surfaces of the bush portions 4 constitute the running path for the teeth of the drive wheel 11, so that during movement the engagement achieved is along a circle involute profile, which facilitates the translational movement of the machine and enables it to move even at high speed with very little wear. The transverse bars 8 strengthen the metal web portion 9 of the link with minimum weight increase. The dimensions of the link and in particular of that surface of the link which is to make contact with the ground can vary according to requirements, in the sense of being larger if the specific pressure on the ground is to be limited, and smaller if manoeuvrability is to be facilitated and wear of the drive wheel and support rollers 14 is to be reduced. The links 2 can be cast in special cast iron which at its melting point has high flowability, so as to achieve high dimensional accuracy and reduce or even eliminate further machining. For this purpose it is preferred to use a cast iron of the following chemical composition: C 3.5 min; Si 2.50; Mn 0.31; S 0.014; P 0.029; Ni 0.5; Mg 0.04; Mo 0.20. By means of a properly designed hardening procedure the correct combination can be obtained between bainite and residual austenite, to attain mechanical characteristics indicatively of the same order of magnitude as a tempered and surface-hardened construction steel. The mechanical characteristics obtained are as follows: R. 1150 N/mm²; Hrc 40; Elongation 10%. The mechanical characteristics obtained represent a satisfactory compromise between hardness and toughness, with optimum wear and fatigue resistance.

I claim:

1. A link for a crawler track, particularly applicable to small-capacity tracked machines, said link comprising a metal piece formed entirely by casting, and an elastomer portion applied to the said metal piece, in which the metal piece formed entirely by casting comprises a shoe portion, transverse bars formed on said shoe portion, a bush portion, and a pair of rail portions having first ends in one piece with the bush portion and second ends each defining a hinge eyelet portion, said hinge eyelet portions having facing inner surfaces, said inner surfaces spaced apart by a distance slightly greater than the axial length of the bush portion to enable links to be hinge-connected together by a respective hinge pin passing through the bush portion of one link and the hinge eyelet portions for connecting said links, said rail portions defining slide surfaces parallel to and opposite the shoe portion, said shoe portion having a rear end portion with a lower surface, said bush portion defining a cylindrical outer surface on which the teeth of the drive wheel act in accordance with an involute profile, the elastomer portion being applied directly by vulcanization to at least one part of the lower surface of the shoe portion, said lower surface to which the elastomer portion is applied having a roughness produced by sandblasting, and between the elastomer portion and said lower surface of the shoe portion there is a thermoplastic polymer layer with softening point of 150 degrees C. and a layer of natural rubber between 0.5 and 1.0 mm thick vulcanizable at about 160 degrees C. for about 30 minutes, and the material of the elastomer portion is a mixture of natural rubber and synthetic rubber, the content of the latter being a maximum of 15%, and wherein after vulcanization the elastomer portion can attain a minimum ultimate tensile strength of 22 daN/cm², a hardness of about 70 Shore, a minimum elongation of 460%, a minimum tear resistance in accordance with ASTM D624 of 150 daN/cm², an abrasion resistance in accordance with DIN 535161 of 90 units maximum, and a density of 1.15 kg/dm³, wherein said elastomer portion is symmetrical about an axis, and coincides with a track advancement axis, said elastomer portion being formed from two substantially identical first half-portions and from two identical second half-portions, said first half-portions having a thickness less than that of said second half-portions which is sufficient to cover said transverse bars of the shoe portion, each of said first half-portions being separated from said adjacent second half-portions along an arched profile, said arched profile being concave to said first portions, said track link having a slot positioned within proximity of a center line of said track link, said slot having its major axis coincident with said track advancement axis, said second half-portions being positioned on opposite sides of said slot and being connected together by a thin layer, said first half-portions and said second half-portions both having bevelled edges, and do not cover the lower surface of the rear end part of the shoe portion which, when the track is assembled, is intended to overlie the link which precedes it in the direction of normal track advancement, said metal piece being made of a cast iron having the following composition: C 3.5 min; Si 2.5; Mn 0.31; S 0.014; P 0.029; Ni 0.5; Mg 0.04; Mo 0.20, with the following mechanical characteristics: R. 1150 N/mm²; Hrc 40; Elongation 10%, wherein each link is connected to other similar links to form a crawler track.

* * * * *